United States Patent
Bhowmik et al.

(10) Patent No.: US 12,192,748 B2
(45) Date of Patent: Jan. 7, 2025

(54) METHOD FOR CONNECTING UE TO DNN IN PUBLIC NETWORK INTEGRATED NPN AND A USER EQUIPMENT

(71) Applicant: Samsung Electronics Co., Ltd., Suwon-si (KR)

(72) Inventors: Samiran Bhowmik, Bangalore (IN); Kailash Kumar Jha, Bangalore (IN); Avneesh Tiwari, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 17/851,714

(22) Filed: Jun. 28, 2022

(65) Prior Publication Data
US 2022/0417814 A1 Dec. 29, 2022

Related U.S. Application Data

(63) Continuation of application No. PCT/KR2022/007293, filed on May 23, 2022.

(30) Foreign Application Priority Data

Jun. 29, 2021 (IN) .............................. 202141028993
Jan. 6, 2022 (IN) .............................. 2021 41028993

(51) Int. Cl.
*H04W 36/00* (2009.01)
*H04W 48/18* (2009.01)

(52) U.S. Cl.
CPC ....... *H04W 36/0079* (2018.08); *H04W 48/18* (2013.01)

(58) Field of Classification Search
None
See application file for complete search history.

(56) References Cited

U.S. PATENT DOCUMENTS 10,716,159 B2   7/2020   Kim et al.
11,032,858 B2   6/2021   Ma et al.
(Continued)

FOREIGN PATENT DOCUMENTS

EP      3 193 538 A1      7/2017
KR      10-2018-0021636 A   3/2018
(Continued)

OTHER PUBLICATIONS

3rd Generation Partnership Project; Technical Specification Group Core Network and Terminals; Non-Access-Stratum (NAS) protocol for 5G System (5GS); Stage 3 (Release 17), 3GPP TS 24.501 V17.3.0 (Jun. 2021), Jun. 28, 2021, pp. 1-825, XP052029852.
(Continued)

*Primary Examiner* — Liem H. Nguyen
(74) *Attorney, Agent, or Firm* — Jefferson IP Law, LLP (57) ABSTRACT

A method for connecting user equipment (UE) to data network name (DNN) in public network integrated non-public network (NPN) is provided. The method includes identifying prioritized DNN and corresponding network slice, from list of prioritized DNNs and network slices, when UE (moves from first location to second location, where session management (SM) retry timer is enabled, disabling SM retry timer based on identification, evaluating user route selection policy (URSP) rule for connecting UE to prioritized DNN and corresponding network slice. Further, the disclosure relates to method receiving rejection cause when UE sends request to connect to higher priority DNN and via corresponding network slice, where SM retry timer is enabled, detecting inactivity of packet transmission for pre-determined time period, and evaluating URSP rule, where UE is connected to higher priority DNN, and corresponding network slice.

20 Claims, 6 Drawing Sheets

(56) References Cited

U.S. PATENT DOCUMENTS

| | | | |
|---|---|---|---|
| 2019/0364615 | A1 | 11/2019 | Das et al. |
| 2020/0351755 | A1* | 11/2020 | Huang-Fu ............. H04W 8/186 |
| 2020/0389835 | A1* | 12/2020 | Talebi Fard .......... H04W 48/06 |
| 2021/0092707 | A1 | 3/2021 | Ryu et al. |
| 2021/0105697 | A1 | 4/2021 | Xu et al. |
| 2021/0227455 | A1 | 7/2021 | Aramoto et al. |
| 2021/0306939 | A1* | 9/2021 | Zhang ................... H04W 76/15 |
| 2022/0060883 | A1* | 2/2022 | Zhu ........................ H04W 8/245 |
| 2022/0060937 | A1 | 2/2022 | Jiang et al. |
| 2022/0104118 | A1 | 3/2022 | Ding |
| 2022/0225093 | A1* | 7/2022 | Sasi ...................... H04W 12/06 |
| 2022/0279378 | A1 | 9/2022 | Kawasaki |
| 2022/0330361 | A1* | 10/2022 | Ding ..................... H04W 48/10 |
| 2023/0041912 | A1* | 2/2023 | Talebi Fard ...... H04W 36/0016 |
| 2024/0163736 | A1* | 5/2024 | Olvera-Hernandez ...................... H04W 36/0033 |

FOREIGN PATENT DOCUMENTS

| | | |
|---|---|---|
| KR | 10-2020-0007606 A | 1/2020 |
| KR | 10-2021-0022086 A | 3/2021 |
| WO | 2019/074347 A1 | 4/2019 |
| WO | 2020/098760 A1 | 5/2020 |
| WO | 2021/029380 A1 | 2/2021 |

OTHER PUBLICATIONS

Extended European Search report dated Jul. 15, 2024, issued in European Patent Application No. 22833404.1.

3rd Generation Partnership Project; Technical Specification Group Core Network and Terminals; Non-Access-Stratum (NAS) protocol for 5G System (5GS); Stage 3 (Release 17), 3GPP TS 24.501 V17.4.1, Sep. 1, 2021, Sophia Antipolis, France.

3rd Generation Partnership Project; Technical Specification Group Services and System Aspects; System architecture for the 5G System (5GS); Stage 2 (Release 17), 3GPP TS 23.501 V17.2.0, Sep. 1, 2021, Sophia Antipolis, France.

Huawei et al., Network initiated remote provisioning for PNI-NPN, S2-210XXXX, 3GPP TSG-WG SA2 Meeting #143E e-meeting, Apr. 6, 2021, Elbonia.

3rd Generation Partnership Project; Technical Specification Group Services and System Aspects; Study on enhanced support of Non-Public Networks (NPN) (Release 17), 3GPP TR 23.700-07 V17.0.0, Mar. 31, 2021, Valbonne, France.

China Telecom et al., Inclusion of the DNN during the PDU session establishment when PAP/CHAP protocol is used, C1-207508, 3GPP TSG-CT WG1 Meeting #127-e, Nov. 23, 2020, Electronic meeting.

Qualcomm Incorporated, TS 23.501: NPN support for PLMN services via N3IWF, S2-1900429, 3GPP TSG-SA2 Meeting #130, Jan. 15, 2019, Kochi, India.

Ericsson et al., Introducing support for Non-Public Networks, S2-1901110, 3GPP TSG-SA WG2 Meeting #130, Jan. 25, 2019, Kochi, India.

International Search Report dated Aug. 19, 2022, issued in International Application No. PCT/KR2022/007293.

Indian Office Action dated Jan. 27, 2023, issued in Indian Patent Application No. 202141028993.

European Search Report dated Oct. 8, 2024, issued in European Application No. 22833404.1.

* cited by examiner

METHOD FOR CONNECTING UE TO DNN IN PUBLIC NETWORK INTEGRATED NPN AND A USER EQUIPMENT

CROSS-REFERENCE TO RELATED APPLICATION(S)

This application is a continuation application, claiming priority under § 365(c), of an International application No. PCT/KR2022/007293, filed on May 23, 2022, which is based on and claims the benefit of an Indian Provisional patent application number 202141028993, filed on Jun. 29, 2021, in the Indian Intellectual Property Office, and of an Indian Complete patent application number 202141028993, filed on Jan. 6, 2022, in the Indian Intellectual Property Office, the disclosure of each of which is incorporated by reference herein in its entirety.

TECHNICAL FIELD

The disclosure relates to telecommunication. More particularly, the disclosure relates to a method and a user equipment (UE) for connecting the UE to data network name (DNN) in a public network integrated non-public network (NPN).

BACKGROUND

A new generation of private $5^{th}$ generation (5G) networks is emerging to address critical wireless communication requirements in public safety, infrastructure, and industry. These private networks are physical or virtual cellular systems that have been deployed for private use by governments, companies, and the like. non-public network (NPN) is the term adopted by $3^{rd}$ generation partnership project (3GPP) for such networks. NPNs need to have critical capabilities and mission-critical functions. The critical capabilities are network features and services that are needed to serve mission-critical, business-critical use cases, and the like. The mission-critical functions are vital to an operation of an organization or a society, such as public safety services, electricity, and the like.

The private networks are built to ensure continuity of service even when unpredictable and undesirable events occur. The private networks also ensure that critical civil functions and business processes have access to high-quality communication, even when parts of the system fail due to external factors. To ensure the continuity of service, secure networks with high availability and reliability must be implemented. The main critical capability requirements of the private networks include availability, reliability, interworking, quality of service, security, and the like. More particularly, interworking with public networks is an important capability needed for the private networks. Many critical services need service continuity while moving from one network to another, for instance from a private network to a public network. This requires a level of integration between networks. This integration is termed as public network integrated NPN.

To deploy the public network integrated NPN, pre-configured data network names (DNNs) and network slices are allocated for the NPNs. A user equipment (UE) has to connect to a DNN and a corresponding network slice that is allocated for the NPN, when moving to a location having access to the NPN services. In conventional systems, the UE does not have information regarding availability of such DNNs and network slices. Hence, when the UE is moving from a location having no access to the NPN services to another location having access to the NPN services, the UE fails to connect to such DNN's and will not get NPN services even when the UE is present in the location having access to the NPN services. In addition, when a priority of normal DNN in a location is higher as compared to the DNN that is allocated for the NPN, the UE will not be able to connect to the normal DNN after transition from the location having access to the NPN services to another location with no access to the NPN services. Hence, the continuity of service is not ensured. Further, there is a latency in connecting to the DNN that is allocated for the NPN. Further, in conventional systems, when the UE tries to connect to a higher priority DNN, network may reject the connection. There is no clear approach for retrying to connect to the higher priority DNNs.

Accordingly, a need exists for limitations of the above-described systems to optimize the public network integrated NPNs.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a UE for connecting the UE to DNN in a public network integrated NPN.

Additional aspects will be set forth in part in the description which follows and, in part, will be apparent from the description, or may be learned by practice of the presented embodiments.

In accordance with an aspect of the disclosure, a method for connecting a user equipment (UE) to a data network name (DNN) in a public network integrated non-public network (NPN) is provided. The method includes identifying a prioritized DNN and a corresponding network slice, from a list of prioritized DNNs and network slices, when the UE moves from a first location to a second location, wherein a session management (SM) retry timer is enabled for reconnecting to the prioritized DNN when the UE connected to a non-prioritized DNN attempts to connect to the prioritized DNN from the first location, disabling the SM retry timer upon identifying the prioritized DNN and the corresponding network slice, and evaluating a user route selection policy (URSP) rule for connecting the UE to the prioritized DNN and the corresponding network slice.

In accordance with another aspect of the disclosure, a UE is provided. The UE includes a communication interface, at least one processor, and a memory. The at least one processor is configured to identify a prioritized DNN and a corresponding network slice, from a list of prioritized DNNs and network slices, when the UE moves from a first location to a second location, wherein a SM retry timer is enabled for reconnecting to the prioritized DNN when the UE connected to a non-prioritized DNN attempts to connect to the prioritized DNN from the first location, disable the SM retry timer upon identifying the prioritized DNN and the corresponding network slice, and evaluate an URS) rule for connecting the UE to the prioritized DNN and the corresponding network slice.

In accordance with another aspect of the disclosure, a method for connecting a UE to a DNN in a public network integrated NPN is provided. The method includes receiving a rejection cause when the UE sends a request to a network server to connect to a higher priority DNN and via a corresponding network slice, wherein a SM retry timer is enabled for re-connecting to the higher priority DNN, upon receiving the rejection cause, detecting inactivity of packet transmission for a pre-determined time period after the SM retry timer is disabled, evaluating an URSP rule, based on the detection, wherein the UE is connected to the higher priority DNN, and the corresponding network slice based on the evaluation.

In accordance with another aspect of the disclosure, a UE is provided. The UE includes a communication interface, at least one processor, and a memory. The at least one processor is configured to receive a rejection cause when the UE sends a request to a network server to connect to a higher priority DNN and via a corresponding network slice, wherein a SM retry timer is enabled for re-connecting to the higher priority DNN, upon receiving the rejection cause, detect inactivity of packet transmission for a pre-determined time period after the SM retry timer is disabled, and evaluate an URSP rule, based on the detection. The UE is connected to the higher priority DNN, and the corresponding network slice based on the evaluation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the word "exemplary" is used herein to mean "serving as an example, instance, or illustration." Any embodiment or implementation of the subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described below. It should be understood, however, that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the disclosure relate to a method for connecting a user equipment (UE) to a data network name (DNN) in a public network integrated non-public network (NPN). The UE may be moving from one location to another location, when connected to a network. The location may or may not have access to NPN services. When the UE tries to connect to DNN and slice having NPN services from a location with no access to the NPN services, a session management (SM) retry timer is enabled for reconnecting to the DNN, which may cause service discontinuity and latency. The disclosure provides a method in which the UE can identity the DNN and a network slice allocated for the NPN, from a list of DNNs and network slices. The UE can stop the SM retry timer and connect to the DNN and the network slice allocated for the NPN. In addition, when the UE is moving from a location with access to the NPN services to another location with no access to the NPN services, the UE can connect to normal DNNs, based on the list. Hence, the disclosure allows faster connection of the UE to the NPN services and normal data services. In addition, the disclosure ensures continuity of service.

Further embodiments of the disclosure relate to a method for connecting the UE to the DNN, when the UE tries to access higher priority DNNs. The disclosure allows the UE to connect to the higher priority DNN after detecting inactivity of packet transmission for a pre-determined time period. Hence, the UE can connect to highest priority DNN without any intervention from network server.

Figure 1:
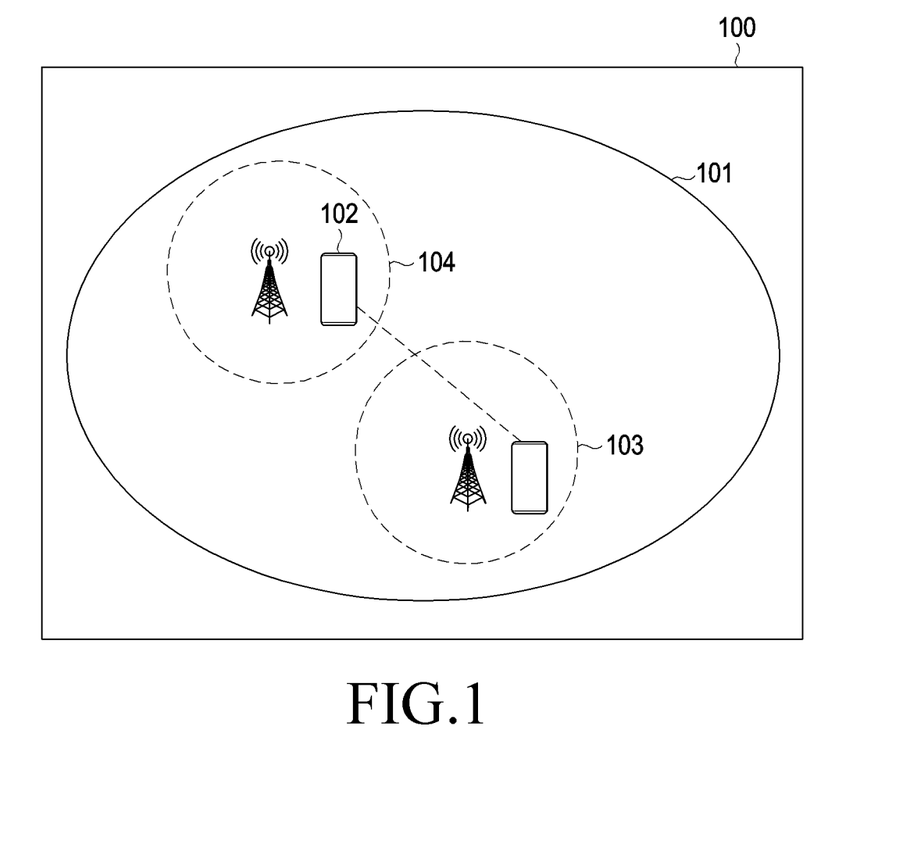
FIG. 1 illustrates an environment for connecting a user equipment (UE) to a data network name (DNN) in a public network integrated non-public network (NPN) according to an embodiment of the disclosure.

FIG. 1 illustrates an environment 100 for connecting a UE to a DNN in a public network integrated NPN according to an embodiment of the disclosure.

Referring to FIG. 1, the environment 100 comprises a cell 101 and a UE 102. The cell 101 is a geographical area covered by a frequency emitted by a base station in a in a public network integrated NPN. The UE 102 may be camped on the cell 101. The public network integrated NPN is a NPN made available via public land mobile network (PLMN). The NPN is made available by means of dedicated DNNs and network slice instances allocated for the NPN. The DNN is a reference or identifier to a data network. Network slicing is a network architecture that enables the multiplexing of virtualized and independent logical networks on the same physical network infrastructure. Each network slice is an isolated end-to-end network tailored to fulfil diverse requirements requested by a particular application. The DNN defines the data network to which the UE 102 requests connectivity to establish access session. This access session is mapped with a network slice allocated for the NPN services. The UE 102 may be a handheld device associated with a user. For example, the UE 102 may be a smartphone, a tablet, and the like. The UE 102 may be any computing device, such as a laptop computer, a desktop computer, a personal computer (PC), a notebook, a smartphone, a tablet, e-book readers, a server, a network server, a cloud-based server, and the like. The UE 102 may have a subscription for the PLMN to access the NPN services.

The UE 102 may move from one location to another location in the cell 101 and from the cell 101 to another cell in the public network integrated NPN. FIG. 1 illustrates the mobility of the UE 102 from a first location 103 to a second location 104 in the cell 101. The first location 103 and the second location 104 may be a closed access group (CAG) location or a non-CAG location. Closed access group identifies a group of subscribers who are permitted to access a location with the NPN services. CAG is used to prevent UEs which are not allowed to access the NPN services. The location with the NPN services is termed as the CAG location in the description. The location with no access to the NPN services or access to normal data services is termed as the non-CAG location in the description. In an example, the first location 103 may be the non-CAG location, and the second location 104 may be the CAG location. In another example, the first location 103 may be the CAG location, and the second location 104 may be the non-CAG location. The UE 102 may attempt to connect to the prioritized DNN from the first location 103. The first location 103 may not have access to the prioritized DNN. A session management (SM) retry timer may be enabled for re-connecting to the prioritized DNN. The SM retry timer indicates a configured UE retry wait time value for the UE 102 to control session management retry behaviour of the UE 102, when prior session management request was rejected by the network. In the disclosure, the UE 102 is configured to identify a prioritized DNN and a corresponding network slice, instead of waiting for the SM retry timer to expire. Further, the UE 102 is configured to disable the SM retry timer upon identifying the prioritized DNN and the corresponding network slice. Furthermore, the UE 102 is configured to evaluate a user route selection policy (URSP) rule. URSP Rules are used to determine whether data detected from an application in the UE 102 can be associated to an established protocol data unit (PDU) session or there is a need to trigger the establishment of a new PDU session. The UE 102 evaluates the URSP rule for connecting the UE 102 to the prioritized DNN and the corresponding network slice.

In an embodiment of the disclosure, the disclosure provides a method for the UE 102 to connect to the DNN, when the UE 102 receives a rejection cause from a network server. The UE 102 may be camped on the cell 101. The UE 102 may send a request to the network server to connect to a higher priority DNN and via a corresponding network slice. The UE 102 may receive the rejection cause and the SM retry timer may be enabled for re-connecting to the higher priority DNN. The UE 102 detects inactivity of packet transmission for a pre-determined time period after the SM retry timer is disabled. Further, the UE 102 re-evaluates the URSP rule, based on the detection. The UE 102 is connected to the higher priority DNN, and the corresponding network slice based on the evaluation.

Figure 2:
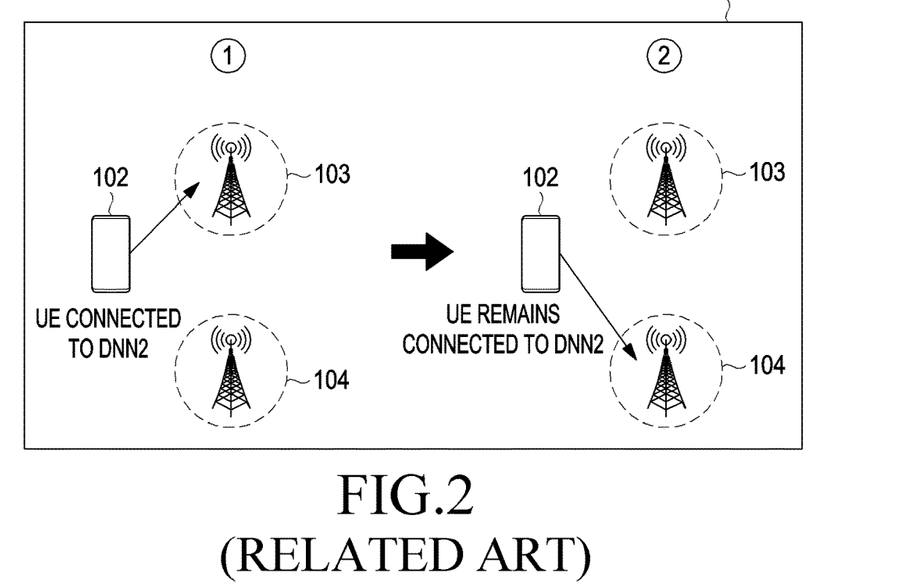
FIG. 2 illustrates connecting a UE to a DNN in a public network integrated NPN according to the related art.

FIG. 2 illustrates a scenario 200 illustrating connecting a UE 102 to a DNN in a public network integrated NPN according to the related art.

Referring to FIG. 2, the scenario 200 illustrates UE 102 connected to a normal DNN referred as DNN2, in the first location 103, at time instance 1. The normal DNN is not allocated for the NPN services. The normal DNN is also referred as a non-prioritized DNN in the description. In a first example, consider the first location 103 is the non-CAG location. The UE 102 may attempt to connect to a prioritized DNN referred as DNN1 (not shown in FIG. 2). The priority of DNN1 may be higher as compared to normal DNN in the URSP rule. In addition, the DNN1 is not available the non-CAG location. Hence, the UE 102 receives a rejection cause from the network server. The common rejection causes may include #8"operator determined barring", #27"missing or unknown DNN", #32"service option not supported", #33"requested service option not subscribed", #70"missing or unknown DNN in a slice", and the like. The SM retry timer is enabled for reconnecting to the DNN1. At time instance 2, the UE 102 moves to the second location 104. The second location 104 may be the CAG location. DNN1 is available in the CAG location. However, the UE 102 will not be able to connect to the DNN, since the SM retry timer is enabled. The UE 102 remains connected to the DNN2. The UE 102 needs to wait until the SM retry timer expires. The default value of the SM retry timer is 12 minutes. Hence, there is a service discontinuity and latency caused due to waiting for the SM retry timer to expire and connect to the NPN services. In addition, this leads to poor user experience. In a second example, consider the first location 103 is the CAG location. The priority of the normal DNN i.e., DNN2 may be higher as compared to the DNN1. The UE 102 in the CAG location will receive the rejection cause, when the UE 102 tries to connect to the normal DNN, as network is providing connectivity through prioritized DNNs in the CAG location. The SM retry timer is enabled for reconnecting to the DNN2. The UE 102 remains connected to the DNN1. The UE 102 needs to wait until the SM retry timer expires to connect to the DNN2.

Figure 3:
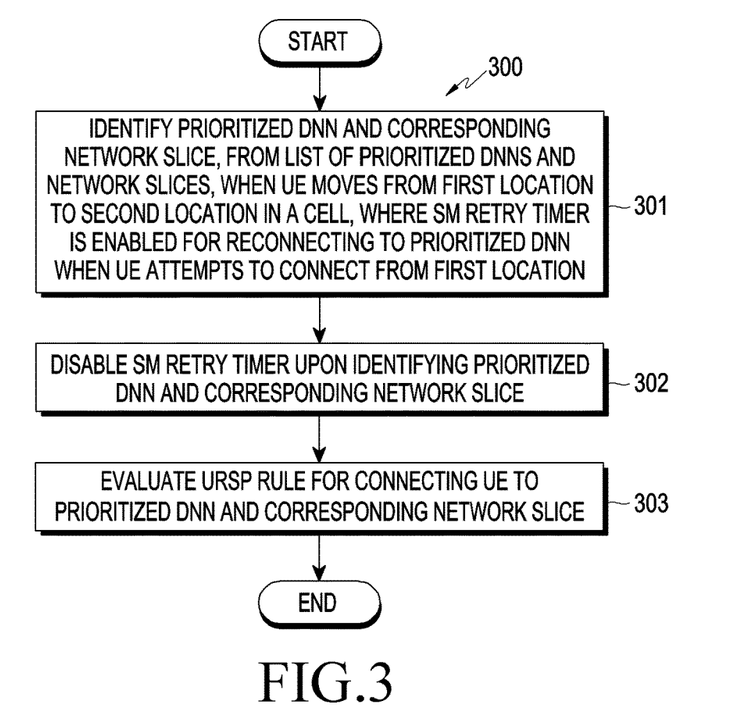
FIG. 3 illustrates a flowchart illustrating method operations for connecting a UE to a DNN in a public network integrated NPN according to an embodiment of the disclosure.

FIG. 3 illustrates a flowchart illustrating method operations for connecting a UE 102 to a DNN in a public network integrated NPN according to an embodiment of the disclosure.

Referring to FIG. 3, a method 300 may comprise one or more operations. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At operation 301, the UE 102 identifies the prioritized DNN and the corresponding network slice, from the list of prioritized DNNs and network slices. Initially, the UE 102 is in the first location 103 in the cell 101. The UE 102 connected to the non-prioritized DNN attempts to connect to the prioritized DNN from the first location 103. The prioritized DNN may not be available in the first location 103. The priority of the prioritized DNN is greater than the priority of a normal DNN in the first location 103 in the URSP rule. Hence, the UE 102 receives the rejection cause from the network. The SM retry timer is enabled for reconnecting to the prioritized DNN. The SM retry timer is enabled upon receiving the rejection cause from a network server when the UE 102 requests to connect to the prioritized DNN in the first location 103. For example, the SM retry timer is enabled with a default value of 12 minutes. The UE 102 moves from the first location 103 to the second location 104 in the cell 101. The UE 102 may be configured to identify the prioritized DNN and the corresponding network slice, when the SM retry timer is still running for reconnecting to the prioritized DNN. The UE 102 is not allowed to send a request for the same DNN i.e., the prioritized DNN until SM retry time expires. The UE 102 may identity the prioritized DNN and the corresponding network slice from the list of prioritized DNNs and network slices. The list of prioritized DNNs and network slices is stored in the UE 102. In an embodiment of the disclosure, the list of prioritized DNNs and network slices is determined based on historical DNN connections associated with the UE 102. The UE 102 may monitor overtime the availability of the prioritized DNNs and corresponding network slices. For example, a user associated with the UE 102 may have visited a hospital. The hospital may be provided with the NPN services. The UE 102 may have connected to a DNN1 allocated for the NPN services. This information may be stored as a first entry in the list. The first entry may comprise a location (example, the hospital) along with the DNN1 and corresponding network slice. After few days or a month, the UE 102 may visit an airport. The airport may be provided with the NPN services. The UE 102 may have connected to a DNN2 allocated for the NPN services. This information may be stored as a second entry in the list. The second entry may comprise the location (example, the airport) along with the DNN2 and corresponding network slice. In this way, the UE 102 may determine the list of prioritized DNNs and network slices based on historical DNN connections associated with the UE 102. The determined list of prioritized DNNs and network slices may be stored in the UE 102. A person skilled in the art will appreciate that entries in the list may be associated with any other information associated with the identified DNN and the corresponding slice. In another embodiment of the disclosure, the list of prioritized DNNs and network slices may be preconfigured by the network server in the UE 102. For example, the network server may preconfigure the list of prioritized DNNs and network slices during initial registration of the UE 102 with the NPN services. The UE 102 may subscribe to the NPN services by sending a registration request to the network server. The network server may preconfigure the list of prioritized DNNs and network slices, upon receiving the registration request. The UE 102 may be configured to identity the prioritized DNN and corresponding network slice from the list of prioritized DNNs and network slices when in the second location 104.

Figure 4A:
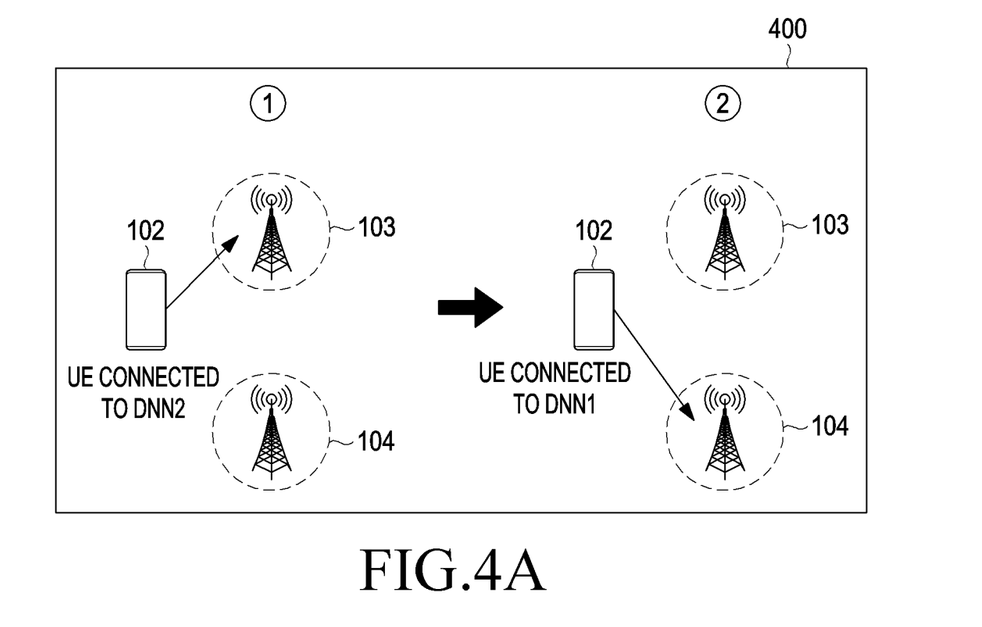
FIGS. 4A and 4B illustrates connecting a UE to a DNN in a public network integrated NPN according to various embodiments of the disclosure.
Figure 4B:
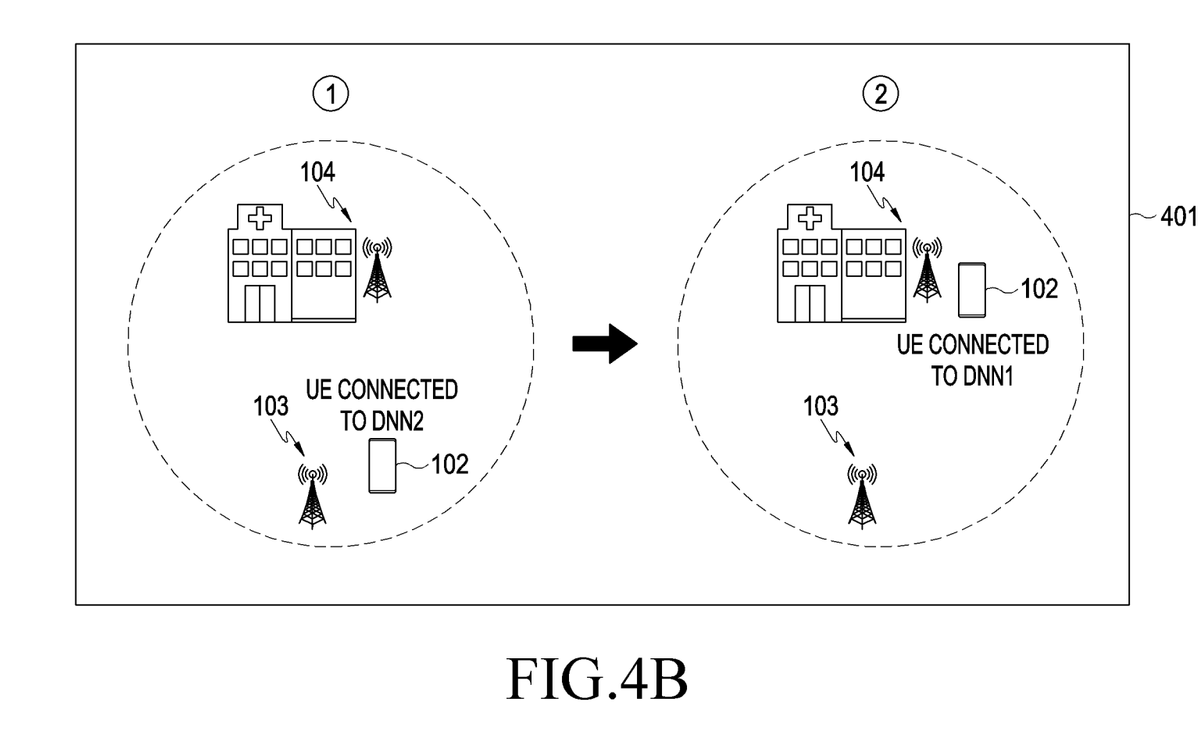

FIGS. 4A and 4B show illustrations for connecting a UE to a DNN in the public network integrated NPN, according to various embodiments of the disclosure.

Referring to FIG. 4A, in element 400, the UE 102 moves from the first location 103 to the second location 104. In a first scenario, the first location 103 is a non-CAG location, and the second location 104 is a CAG location. At a time instance 1, the UE 102 may be connected to DNN2 in the non-CAG location. The UE 102 may have attempted to connect to a prioritized DNN from the non-CAG location. The prioritized DNN may be a DNN allocated for the NPN services. This is also referred as an NPN-specific DNN. The SM retry timer may be running for reconnecting to the NPN-specific DNN. At a time instance 2, the UE 102 may move from the non-CAG location to the CAG location. The UE 102 identifies whether the prioritized DNN and the corresponding network slice is present in the list of prioritized DNNs and network slices. The prioritized DNN is illustrated as DNN1. In a second scenario, the first location 103 is a CAG location, and the second location 104 is a non-CAG location. At a time instance 1, the UE 102 may be connected to DNN1 in the CAG location. The priority of normal DNN may be greater than the NPN-specific DNN. The UE 102 may have attempted to connect to a prioritized DNN from the CAG location. The SM retry timer may be running for reconnecting to the normal DNN. At a time instance 2, the UE 102 may move from the CAG location to the non-CAG location. The UE 102 identifies whether the prioritized DNN and the corresponding network slice is not present in the list of prioritized DNNs and network slices.

Referring back to FIG. 3, at operation 302, the UE 102 disables the SM retry timer upon identifying the prioritized DNN and the corresponding network slice. The SM retry timer may be implemented as a software timer in the UE 102. The SM retry timer may be associated with a value indicated by the network server. The network server may transmit value associated with the SM retry timer in the rejection cause transmitted by the network server. For example, the rejection cause may be an ATTACH REJECT message. The SM retry timer which is enabled for reconnecting to the prioritized DNN may be disabled by the UE 102, upon identifying the prioritized DNN and the corresponding network slice. Since the UE 102 has information on availability of the prioritized DNNs and corresponding network slices from the list, the UE 102 need not wait for the SM retry timer to expire and then connect to the prioritized DNN. Once the UE 102 identifies the prioritized DNN and the corresponding network slice, the UE 102 may disable the SM retry timer. For example, initial value of the SM retry timer may be 12 minutes. The UE 102 may identify the prioritized DNN and the corresponding network slice. The value associated with the SM retry timer may have decremented to 5 minutes. The UE 102 may disable the SM retry timer at this point. Referring again to the element 400 in FIG. 4A, the SM retry timer may be disabled in both the first and second scenarios, upon identifying the prioritized DNN and the corresponding network slice.

Referring back to FIG. 3, at operation 303, the UE 102 evaluates the URSP rule for connecting the UE 102 to the prioritized DNN and the corresponding network slice. The URSP rule is used to determine if data detected from an application in the UE 102 can be associated to an established PDU session or there is a need to trigger the establishment of a new PDU session. The URSP includes a prioritized list of URSP rules. Each URSP rule contains a Traffic descriptor containing one or more components. The traffic descriptor determines when each URSP rule is applicable. A URSP rule is determined to be applicable when every component in the traffic descriptor matches corresponding information from the application in the UE 102. Each URSP rule contains a list of route selection descriptors containing one or multiple route selection descriptors each having a different route selection descriptor precedence value. Table 1 illustrates the URSP rules. As seen from the table, the URSP rules are associated with the traffic descriptors containing the one or more components. Table 2 illustrates the route selection descriptors. For example, access type preference indicates preferred Access Type (3GPP or non-3GPP or multi-access) when the UE 102 establishes the PDU Session for the application. The 3GPP or non-3GGP access for offloading the data of the application may be determined from the access type preference.

TABLE 1

| Information name | Description | Category | PCF permitted to modify in a UE context | Scope |
| --- | --- | --- | --- | --- |
| Rule Precedence | Determines the order the URSP rule is enforced in the UE. | Mandatory | Yes | UE context |
| Traffic descriptor | This part defines the Traffic descriptor components for the URSP rule. | Mandatory | | |
| Application descriptors | It consists of OSId and OSAppId(s). | Optional | Yes | UE context |
| IP descriptors | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |
| Non-IP descriptors | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. | Optional | Yes | UE context |
| List of Route Selection Descriptors | A list of Route Selection Descriptors. | Mandatory | | |

TABLE 2

| Information name | Description | Category | PCF permitted to modify in URSP | Scope |
| --- | --- | --- | --- | --- |
| Route Selection Descriptor Precedence | Determines the order in which the Route Selection Descriptors are to be applied. | Mandatory | Yes | UE context |

TABLE 2-continued

| Information name | Description | Category | PCF permitted to modify in URSP | Scope |
|---|---|---|---|---|
| Route selection components | This part defines the route selection components | Mandatory | | |
| SSC Mode Selection | One single value of SSC mode. (NOTE 5) | Optional | Yes | UE context |
| Network Slice Selection | Either a single value or a list of values of S-NSSAI(s). | Optional | Yes | UE context |
| DNN Selection | Either a single value or a list of values of DNN(s). | Optional | Yes | UE context |
| PDU Session Type Selection | One single value of PDU Session Type | Optional | Yes | UE context |
| Non-Seamless Offload indication | Indicates if the traffic of the matching application is to be offloaded to non-3GPP access outside of a PDU Session. | Optional | Yes | UE context |
| Access Type preference | Indicates the preferred Access Type (3GPP or non-3GPP or Multi-Access) when the UE establishes a PDU Session for the matching application. | Optional | Yes | UE context |
| Route Selection Validation Criteria (NOTE 6) | This part defines the Route Validation Criteria components | Optional | | |
| Time Window | The time window when the matching traffic is allowed. The RSD is not considered to be valid if the current time is not in the time window. | Optional | Yes | UE context |
| Location Criteria | The UE location where the matching traffic is allowed. The RSD rule is not considered to be valid if the UE location does not match the location criteria. | Optional | Yes | UE context |

The UE 102 receives updated URSP rules and evaluates or evaluates the URSP rules in a timely manner when certain conditions are met. For example, the conditions in the methods of the related art may include the URSP is updated by policy control function (PCF), the UE moves from evolved packet core (EPC) to 5G Core (5GC), change of allowed network slice selection assistance information (NS-SAI) or configured NSSAI, change of DNN availability, UE registers over 3GPP or non-3GPP access, and UE establishes connection to a WLAN access. In the systems of the related art, change of DNN availability status, or SM Retry timer expiry is not mentioned as one of the criteria to re-evaluate URSP rule. In the disclosure, the UE 102 is configured to evaluate the URSP rule for connecting the UE 102 to the prioritized DNN and the corresponding network slice. The UE 102 evaluates the URSP rule to determine whether the priority of the prioritized DNN is greater than current DNN. The UE 102 connects to the prioritized DNN and the corresponding network slice, upon determination. Referring again to the element 400 in FIG. 4A, in the first scenario, the UE connects to DNN1 after evaluating the URSP rule. In the second scenario, the UE connects to DNN2 after evaluating the URSP rule. Hence, the disclosure allows faster connection of the UE 102 to the NPN services and the normal data services.

Reference is now made to element 401 in FIG. 4B. FIG. 4B illustrates connecting the UE 102 to the DNN in a public network integrated NPN. At a time instance 1, the UE 102 is in the first location 103. The first location 103 may be an area outside a hospital. The first location 103 may be a non-CAG location. The UE 102 attempts to connect to the NPN-specific DNN. The SM retry timer is enable for reconnecting to the NPN-specific DNN. At a time instance 2, the UE 102 moves from the first location 103 to the second location 104. The second location 104 may be an area inside the hospital. The second location 104 may be a CAG location. The UE 102 identifies the NPN-specific DNN and corresponding network slice from the list of prioritized DNNs and network slices, when the SM retry timer is still running. Further, the UE 102 disables the SM retry timer, upon identifying the NPN-specific DNN and the corresponding network slice. Then, the UE 102 evaluates the URSP rule to connect to the NPN-specific DNN. Hence, the disclosure allows faster connection of the UE 102 to the NPN services.

Figure 5:
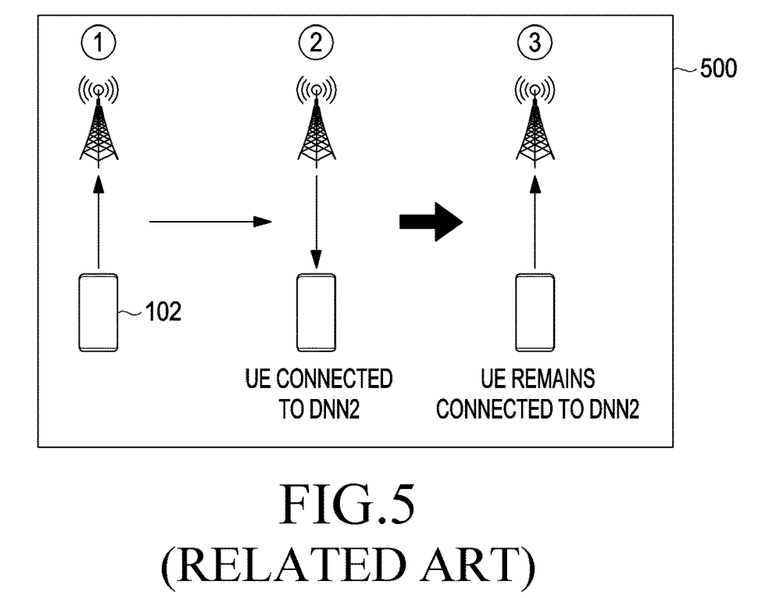
FIG. 5 illustrates connecting a UE to a DNN in a public network integrated NPN, when a UE receives a rejection cause, according to the related art.

FIG. 5 illustrates a scenario 500 illustrating connecting a UE 102 to a DNN in a public network integrated NPN when a UE 102 receives a rejection cause according to the related art.

Referring to FIG. 5, at time instance 1, the UE 102 sends a request to the network server to connect to the higher priority DNN and via the corresponding network slice. The UE 102 is connected to DNN2 and a corresponding network slice. At time instance 2, the UE 102 receives a rejection cause from the network server. The SM retry timer is enabled for re-connecting to the higher priority DNN, upon receiving the rejection cause. In the systems of the related art, there is no clear approach for retrying to connect to the higher priority DNN, after the SM retry timer expires. Hence, at a time instance 3, the UE 102 remains connected to lower priority DNN i.e., DNN2.

Hence, user will be experiencing poor services even though higher priority DNN with better services may be available.

Figure 6:
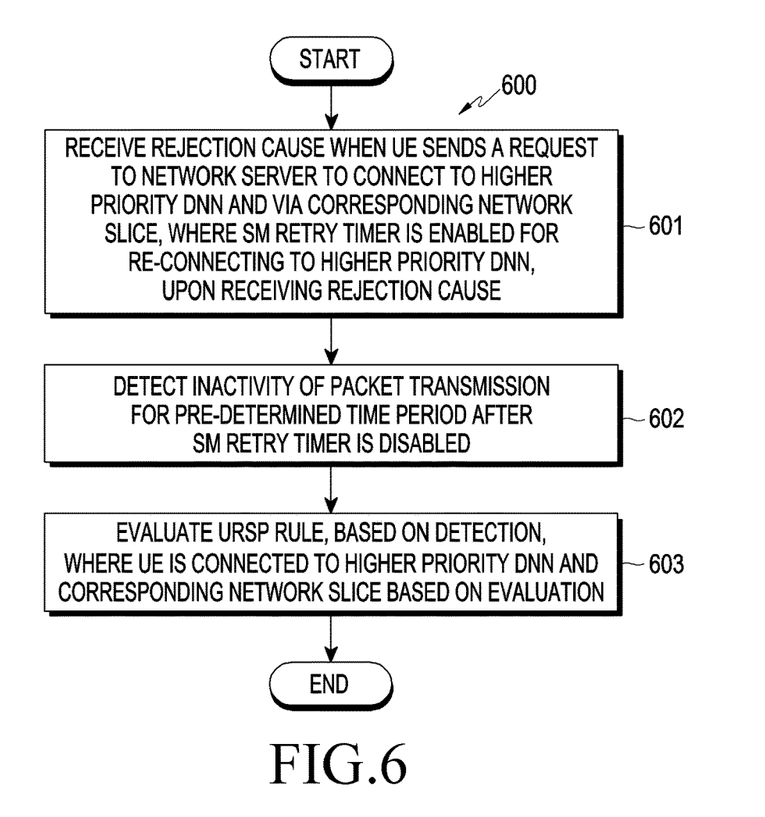
FIG. 6 illustrates a flowchart illustrating method operations for connecting a UE to a DNN in a public network integrated NPN, when a UE receives a rejection cause, according to an embodiment of the disclosure.

FIG. 6 illustrates a flowchart illustrating method operations for connecting a UE 102 to a DNN in a public network integrated NPN, when a UE 102 receives a rejection cause according to an embodiment of the disclosure.

Referring to FIG. 6, a method 600 may comprise one or more operations. The method 600 may be described in the general context of computer executable instructions. Generally, computer executable instructions can include routines, programs, objects, components, data structures, procedures, modules, and functions, which perform particular functions or implement particular abstract data types.

The order in which the method 600 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At operation 601, the UE 102 receives the rejection cause when the UE 102 sends a request to the network server to connect to the higher priority DNN and via the corresponding network slice. Common rejection causes from the network server may include #8 "operator determined barring", #27 "missing or unknown DNN", #32 "service option not supported", #33 "requested service option not subscribed, and the like. The rejection cause may be transmitted as a reject message from the network server. For example, the reject message may include an ATTACH REJECT message. The SM retry timer is enabled for re-connecting to the higher priority DNN, upon receiving the rejection cause. A start value of the SM retry timer may be a default value of 12 minutes.

Figure 7:
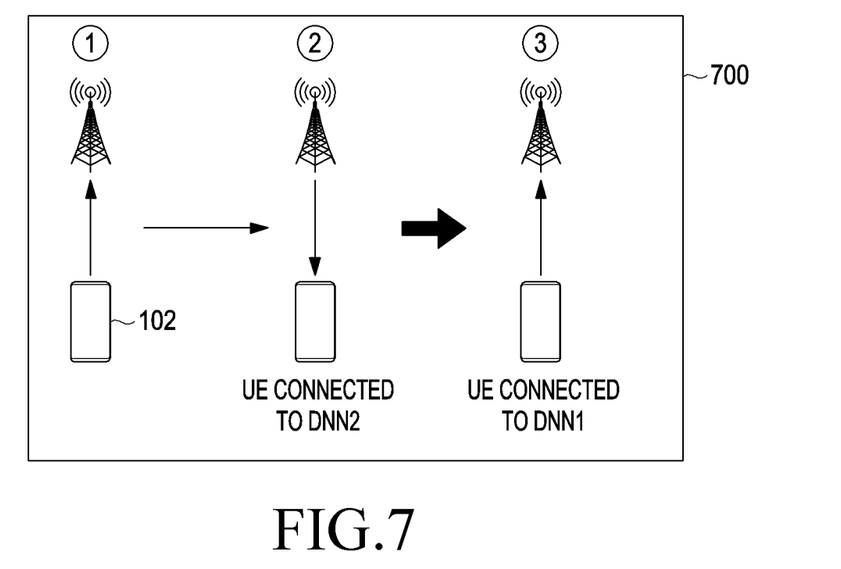
FIG. 7 illustrates a UE to a DNN in a public network integrated NPN, when a UE receives a rejection cause, according to an embodiment of the disclosure.

FIG. 7 illustrates connecting a UE to a DNN in a public network integrated NPN, when a UE receives a rejection cause according to an embodiment of the disclosure.

Referring to FIG. 7, in element 700, at time instance 1, the UE 102 may be initially connected to DNN2. The UE 102 may request the network server to connect to the higher priority DNN and via the corresponding network slice. At time instance 2, the UE 102 may receive the rejection cause from the network server.

At operation 602, the UE 102 detects inactivity of packet transmission for a pre-determined time period after the SM retry timer is disabled. The SM retry timer is disabled after a pre-defined time duration. The pre-defined time duration may be a default value of 12 minutes. A person skilled in the art will appreciate that this value may vary, for example, default value may be re-configured by the network server. The UE 102 may be configured to compare the rejection cause with the list of rejection causes stored in the UE 102. The list of rejection causes may be pre-defined rejection causes that determine the UE 102 connected to the lower priority DNN. The UE 102 may determine that the UE 102 is connected to the lower priority DNN, based on the comparison. Further, the UE 102 may be configured to detect the inactivity of packet transmission upon determining that the UE 102 is connected to a lower priority DNN. The inactivity of packet transmission is determined to retry to connect to the higher priority DNN, without effecting data transmission in the UE 102. The inactivity of packet transmission may be detected for the pre-determined time period. For example, the pre-determined time period may be 2 seconds. Referring to element 700, the UE 102 may detect the inactivity of packet transmission for a pre-determined time period after the SM retry timer is disabled.

At operation 603, the UE 102 evaluates the URSP rule, based on the detection. The UE 102 retries to connect to the higher priority DNN, upon detecting the inactivity of packet transmission for the pre-determined time period. The UE 102 is configured to evaluate the URSP rule to determine the priority of the DNNs. The UE 102 determines the priority of the higher priority DNN to be greater than the priority of current DNN. The UE 102 is connected to the higher priority DNN, and the corresponding network slice based on the evaluation. The UE 102. Referring to element 700 in FIG. 7, at time instance 3, the UE 102 connects to the higher priority DNN i.e., DNN1 after evaluating the URSP rule. Hence, the UE 102 can connect to highest priority DNN with better services, without any intervention from the network server.

Figure 8:
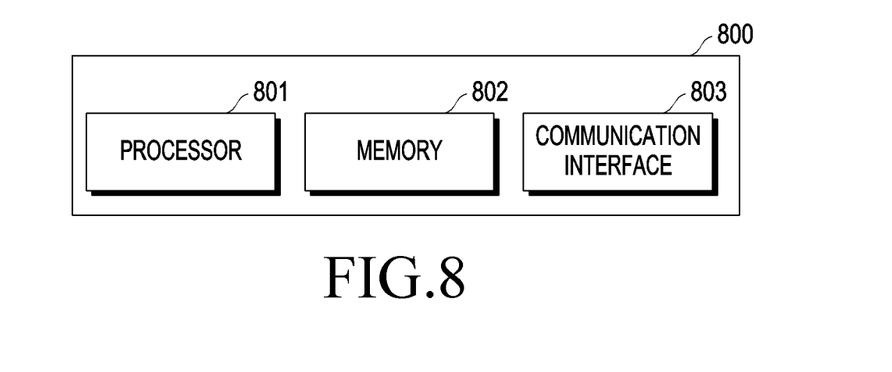
FIG. 8 illustrates overview architecture of a UE for connecting the UE to a DNN in a public network integrated NPN according to an embodiment of the disclosure.

FIG. 8 illustrates overview architecture 800 of a UE 102 for connecting the UE to a DNN in a public network integrated NPN according to an embodiment of the disclosure.

Referring to FIG. 8, the UE 102 may comprise a processor 801, a memory 802, and a communication interface 803. In some embodiments of the disclosure, the memory 802 may be communicatively coupled to the processor 801. The memory 802 stores instructions executable by the processor 801. The processor 801 may comprise at least one data processor for executing program components for executing user or system-generated requests. The memory 802 may be communicatively coupled to the processor 801. The memory 802 stores instructions, executable by the processor 801, which, on execution, may cause the processor 801 to connect the UE 102 to the DNN in the public network integrated NPN. The communication interface 803 is configured to transmit and receive messages/signals/control signaling. For example, the communication interface 803 may be configured to transmit the request to the network server for connecting to the DNN. The communication interface 803 may be configured to receive the rejection cause from the network server. Further, the UE 102 may comprise sub-modules such as application processor, database, timer control module, URSP rule evaluation module and other hardware modules. The application processor may be configured to identify the prioritized DNN and the corresponding network slice, from the list of prioritized DNNs and network slices stored in the database. Further, the application processor may be configured to detect the inactivity of packet transmission for the pre-determined time period. The timer control module may be configured to disable the SM retry timer. The URSP rule evaluation module may be configured to evaluate the URSP rule to connect the UE 102 to the DNN.

The disclosure allows faster connection of the UE to the NPN services and normal data services. In addition, the disclosure ensures continuity of service.

The disclosure allows the UE to connect to the higher priority DNN after detecting inactivity of packet transmission. Hence, the UE can connect to highest priority DNN with better services, without any intervention from network server.

The terms "an embodiment", "embodiment", "embodiments", "the embodiment", "the embodiments", "one or more embodiments", "some embodiments", and "one embodiment" mean "one or more (but not all) embodiments of the disclosure(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The illustrated operations of FIGS. 4A, 5, and 6 show certain events occurring in a certain order. In alternative embodiments of the disclosure, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this description, but rather by any claims that issue on an application based here on. Accordingly, the disclosure of the embodiments of the disclosure is intended to be illustrative, but not limiting, of the scope of the disclosure, which is set forth in the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for connecting a user equipment (UE) to a data network name (DNN) in a public network integrated non-public network (NPN), the method comprising:
   identifying, by the UE, a prioritized DNN and a corresponding network slice, from a list of prioritized DNNs and network slices, when the UE moves from a first location to a second location, wherein a timer is enabled for reconnecting to the prioritized DNN when the UE connected to a non-prioritized DNN attempts to connect to the prioritized DNN from the first location;
   disabling, by the UE, the timer upon identifying the prioritized DNN and the corresponding network slice; and
   evaluating, by the UE, a user route selection policy (URSP) rule for connecting the UE to the prioritized DNN and the corresponding network slice.

2. The method of claim 1, wherein the first location is a closed access group (CAG) location, and the second location is a non-CAG location.

3. The method of claim 1, wherein the first location is a non-CAG location, and the second location is a CAG location.

4. The method of claim 1, wherein the prioritized DNN is a DNN allocated for non-public network (NPN) services and the non-prioritized DNN is a DNN not allocated for non-public network (NPN) services.

5. The method of claim 1, wherein identifying the prioritized DNN and the corresponding network slice comprises:
   identifying that the prioritized DNN and the corresponding network slice is present in the list of prioritized DNNs and network slices, when the first location is a non-CAG location, and the second location is a CAG location; and
   identifying that the prioritized DNN and the corresponding network slice is not present in the list of prioritized DNNs and network slices, when the first location is the CAG location, and the second location is the non-CAG location.

6. The method of claim 1, wherein the timer is enabled upon receiving a rejection cause from a network server when the UE requests to connect to the prioritized DNN in the first location.

7. The method of claim 1, wherein the list of prioritized DNNs and network slices is stored in the UE.

8. The method of claim 7, wherein the list of prioritized DNNs and network slices are one of, preconfigured by a network server in the UE and determined based on historical DNN connections associated with the UE.

9. A user equipment (UE) comprising:
   a communication interface;
   at least one processor;
   a memory storing processor-executable instructions, which, on execution, cause the at least one processor to:
      identify a prioritized data network name (DNN) and a corresponding network slice, from a list of prioritized DNNs and network slices, when the UE moves from a first location to a second location, wherein a timer is enabled for reconnecting to the prioritized DNN when the UE connected to a nonprioritized DNN attempts to connect to the prioritized DNN from the first location, disable the timer upon identifying the prioritized DNN and the corresponding network slice, and evaluate a user route selection policy (URSP) rule for connecting the UE to the prioritized DNN and the corresponding network slice.

10. The UE of claim 9, wherein the first location is a closed access group (CAG) location, and the second location is a non-CAG location.

11. The UE of claim 9, wherein the first location is a non-CAG location, and the second location is a CAG location.

12. The UE of claim 9, wherein the prioritized DNN is a DNN allocated for non-public network (NPN) services and the non-prioritized DNN is a DNN not allocated for non-public network (NPN) services.

13. The UE of claim 9, wherein the at least one processor is configured to perform identification by:

identifying that the prioritized DNN and the corresponding network slice is present in the list of prioritized DNNs and network slices, when the first location is a non-CAG location, and the second location is a CAG location; and identifying that the prioritized DNN and the corresponding network slice is not present in the list of prioritized DNNs and network slices, when the first location is the CAG location, and the second location is the non-CAG location.

14. The UE of claim 9, wherein the timer is enabled upon receiving a rejection cause from a network server when the UE requests to connect to the prioritized DNN in the first location.

15. The UE of claim 9, wherein the list of prioritized DNNs and network slices is stored in the UE.

16. The UE of claim 15, wherein the list of prioritized DNNs and network slices are one of, preconfigured by a network server in the UE and determined based on historical DNN connections associated with the UE.

17. A method for connecting a user equipment (UE) (to a data network name (DNN) in a public network integrated non-public network (NPN), the method comprising:

receiving, by the UE, a rejection cause when the UE sends a request to a network server to connect to a higher priority DNN and via a corresponding network slice, wherein a session management (SM) retry timer is enabled for re-connecting to the higher priority DNN, upon receiving the rejection cause;

detecting, by the UE, inactivity of packet transmission for a time period after the SM retry timer is disabled; and evaluating, by the UE, a user route selection policy (URSP) rule, based on the detection, wherein the UE is connected to the higher priority DNN and via the corresponding network slice based on the evaluation.

18. The method of claim 17, wherein the inactivity of packet transmission is detected upon determining that the UE is connected to a lower priority DNN, and wherein the determining comprises comparing the rejection cause with a list of rejection causes stored in the UE.

19. The method of claim 17, wherein the SM retry timer is disabled after a pre-defined time duration.

20. The method of claim 17, wherein the SM retry timer is associated with a value indicated by the network server, and wherein the network server transmits the value associated with the SM retry timer in the rejection cause transmitted by the network server.

* * * * *